UNITED STATES PATENT OFFICE.

GEORGE BELL FRANKFORTER, OF MINNEAPOLIS, MINNESOTA.

ABSOLUTE ALCOHOL AND THE PROCESS OF MAKING THE SAME.

1,350,254.     Specification of Letters Patent.     Patented Aug. 17, 1920.

No Drawing.     Application filed December 20, 1918. Serial No. 267,678.

(FILED UNDER THE ACT OF MARCH 3, 1883, 22 STAT. L., 625.)

*To all whom it may concern:*

Be it known that I, GEORGE BELL FRANKFORTER, a citizen of the United States, and a resident of Minneapolis, Minn., have invented an Improvement in Absolute Alcohol and the Processes of Making the Same, of which the following is a specification.

The invention described herein may be used by the Government, or any of its officers or employees in prosecution of work for the Government, or by any other person in the United States, without payment of any royalty thereon.

This invention relates to a process for making commercial absolute and absolute alcohol whereby all water may be removed from common commercial alcohol.

Up to the beginning of the last century, alcohol containing more than 95% was unknown. This was and is now the purest alcohol obtainable by the most perfect Coffey still. When it was found that alcohol could be prepared containing more than 95% alcohol and less than 5% of water, the newly prepared product was called absolute alcohol. Therefore absolute alcohol came to mean an alcohol containing less than 5% of water. Later, the percentage of water was lowered and 98–99% alcohol was produced and called absolute alcohol but soon this term had to be changed to "commercial absolute alcohol" when alcohol 99.8% pure was produced which is today called "absolute" alcohol. However, the absolute alcohol referred to as being produced by the herein-described process is 100% pure.

It is well known that when common alcohol is treated with some dehydrating reagent as anhydrous copper sulfate, calcium chlorid or quicklime, the water in the alcohol is absorbed by the reagent and by separating the partially dehydrated alcohol from the reagent and distilling an alcohol of higher purity than 95% is obtained. Anhydrous copper sulfate and calcium chlorid are not satisfactory as they do not remove all the water and occasion considerable loss. Quicklime, although it gives satisfactory results, requires time and entails considerable loss of alcohol on account of the large proportion of lime necessary to completely dehydrate the alcohol.

My discovery embodies three steps which with modifications are as follows:

The first step involves the removal of half or two-thirds of the water by a so called "salting out process" depending upon the fact that certain salts, or mixtures of salts, like potassium fluorid and potassium carbonate, absorb water and when added to common alcohol and allowed to stand for some little time, form a layer at the bottom of the receptacle consisting chiefly of salt and water and leave the partially dehydrated alcohol in the top layer. Potassium fluorid can not be used alone on account of the fact that it hydrolyzes, and causes considerable loss. With an appreciable proportion of potassium carbonate present, however, this difficulty is practically eliminated.

This step is carried out in a retort provided with a stirrer and steam jacket for heating and distilling off the partially dehydrated alcohol. When this is complete and the alcohol is practically all distilled off, the process is stopped, the retort connected with a second condenser and the treating continued with constant stirring until the last traces of water are distilled off and the salt mixture is dried and granulated and ready to be used over again. Alcohol thus prepared will, usually, pass specifications for the so called "commercial absolute alcohol." The second step involves the treatment of the above so called commercial absolute with quicklime under pressure of approximately 55 lbs. in an autoclave retort similar to the one used in the first step for a short time, approximately one hour. This treatment removes all except traces of water.

The third step involves the distillation, at approximately the pressure heretofore mentioned, of the alcohol from the autoclave retort containing the lime hydrate formed by the water in the alcohol combining with the quicklime and unchanged quicklime. Before reacting to the condenser, however, the alcohol vapors pass through a vertical drum, which drum is under the pressure of approximately 55 lbs. per square inch, connecting the retort with the condenser and containing granulated calcium carbid. By bringing the alcohol vapors in contact with the carbid the last traces of water are removed and an alcohol of practically 100% is obtained. Owing to the remarkable hygroscopicity of absolute alcohol the greatest precautions are necessary in order to keep it from absorbing water. Traps filled with quicklime are necessary in order to keep it from absorbing moisture from the air during the process of distillation.

I have been able by my process, to prepare absolute alcohol without difficulty which gave all tests for 100% pure alcohol.

It should be stated that the mixture of the two salts, potassium carbonate and potassium fluorid is unique in its dehydrating power. Both salts are powerful dehydrants and the mixture seems to be doubly active on this account. I claim, therefore, that the salting out properties of this mixture are new and novel and that no other mixture known will act as it does.

Having therefore described my process what I claim is as follows:

1. A process for the preparation of absolute alcohol consisting in treating common commercial alcohol with a mixture of potassium carbonate and potassium fluorid so as to remove some of the water, decanting the alcohol, then heating in an autoclave retort under a pressure of approximately 55 pounds per square inch with quicklime until all but a trace of water has been removed and finally distilling and passing the vapor formed by distillation over calcium carbid whereby the last trace of water is removed.

2. A process of preparing absolute alcohol consisting in treating common commercial alcohol with a mixture of dehydrating salts, decanting the alcohol, heating the partially dehydrated alcohol in an autoclave retort with quicklime and finally distilling the alcohol and passing the vapor formed by distillation through calcium carbid.

3. A process of preparing absolute alcohol consisting in heating common commercial alcohol with a mixture of dehydrating salts, decanting the alcohol, heating the partially dehydrated alcohol in an autoclave retort with quicklime and finally distilling and passing the vapor formed by distillation through calcium carbid.

4. A process of preparing absolute alcohol consisting in treating common commercial alcohol with a mixture of dehydrating salts, distilling off the partially dehydrated alcohol, then heating in an autoclave retort with quicklime and finally distilling and passing the vapor formed by distillation through calcium carbid.

5. A process of preparing absolute alcohol consisting in treating common commercial alcohol with a mixture of dehydrating salts which is soluble, alkaline and has salting out properties, removing the partly dehydrated alcohol, then heating the alcohol in an autoclave retort with quicklime and finally distilling the alcohol and passing the vapor formed by distillation through calcium carbid.

6. A process of preparing absolute alcohol consisting in treating common commercial alcohol with a mixture of dehydrating salts which is soluble, alkaline and has salting out properties, removing the partially dehydrated alcohol, then heating the alcohol in an autoclave retort with quicklime, under a pressure of approximately 55 pounds per square inch and finally distilling the alcohol and passing the vapor formed by distillation through calcium carbid.

GEORGE BELL FRANKFORTER.